(12) United States Patent
Chang

(10) Patent No.: US 7,253,860 B2
(45) Date of Patent: Aug. 7, 2007

(54) OCB LIQUID CRYSTAL DISPLAY WITH SPECIFIC REFRACTIVE INDICES AND INEQUALITY RELATIONS

(75) Inventor: Ting-Jui Chang, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 26 days.

(21) Appl. No.: 10/709,374

(22) Filed: Apr. 30, 2004

(65) Prior Publication Data

US 2004/0223104 A1  Nov. 11, 2004

(30) Foreign Application Priority Data

May 8, 2003  (TW) .............................. 92112535 A

(51) Int. Cl.
*G02F 1/1335* (2006.01)
(52) U.S. Cl. .................. 349/118; 349/119; 349/121
(58) Field of Classification Search ................ 349/118, 349/114
See application file for complete search history.

(56) References Cited

U.S. PATENT DOCUMENTS

| | | | | |
|---|---|---|---|---|
| 6,801,283 | B2 * | 10/2004 | Koyama et al. ............ 349/119 |
| 6,856,368 | B2 * | 2/2005 | Terashita et al. ............ 349/129 |
| 2001/0030726 | A1 * | 10/2001 | Yoshida et al. ............. 349/117 |
| 2001/0048497 | A1 * | 12/2001 | Miyachi et al. ............. 349/117 |
| 2001/0050744 | A1 * | 12/2001 | Song et al. ................. 349/139 |
| 2002/0033923 | A1 * | 3/2002 | Shimoshikiryou et al. .. 349/141 |
| 2002/0063819 | A1 * | 5/2002 | Yano et al. .................. 349/96 |
| 2003/0016325 | A1 * | 1/2003 | Konno et al. ............... 349/117 |
| 2003/0067574 | A1 * | 4/2003 | Sasaki et al. ............... 349/117 |
| 2003/0122991 | A1 * | 7/2003 | Itakura et al. ................ 349/43 |

* cited by examiner

*Primary Examiner*—Andrew Schechter
*Assistant Examiner*—Lucy Chien
(74) *Attorney, Agent, or Firm*—Jianq Chyun IP Office

(57) ABSTRACT

A wide viewing angle liquid crystal display comprises a back light unit, an optical compensation circular polarizer unit, a liquid crystal panel and an optical compensation circular analyzer unit. The optical compensation circular polarizer unit is set over the back light unit. The liquid crystal panel is set over the optical compensation circular polarizer unit. The optical compensation circular analyzer unit is set over the liquid crystal panel. The liquid crystal display operates using circularly polarized light to improve uniformity of viewing angle properties and contrast ratio, and prevent gray level inversion due to wide-angle viewing.

5 Claims, 6 Drawing Sheets

OCB LIQUID CRYSTAL DISPLAY WITH SPECIFIC REFRACTIVE INDICES AND INEQUALITY RELATIONS

CROSS REFERENCE TO RELATED APPLICATIONS

This application claims the priority benefit of Taiwan application serial no. 92112535, filed on May 8, 2003.

BACKGROUND OF INVENTION

1. Field of the Invention

The present invention generally relates to a wide viewing angle rapid response liquid crystal display, and more particularly, the present invention relates to a wide viewing angle rapid response liquid crystal display that operated by circularly polarized light.

2. Description of the Related Art

The proliferation of multi-media systems in our society depends to a large extent on the progressive development of semiconductor devices and display devices. Display devices such as the cathode ray tube (CRT) have been used for quite some time due to its remarkable display quality, reliability and low cost. Although the conventional CRT has many advantages, the design of the electron gun renders it heavy, bulky and energy wasting. Moreover, there is always some potential risk of hurting viewer's eyes due to its emission of some radiation. With big leaps in the techniques of manufacturing semiconductor devices and opto-electronics devices, high picture quality, slim, low power consumption and radiation-free displays such as the thin film transistor liquid crystal displays (TFT LCD) have gradually become mainstream display products.

FIG. 1 is a perspective view showing the structural layout of a conventional wide viewing angle rapid response liquid crystal display. As shown in FIG. 1, the liquid crystal display 100 mainly comprises a back light module 102, a linear polarizer 104, a pair of compensation films 106 and 110, an optically self-compensated birefringence liquid crystal panel (OCB-LCD) 108 and a linear analyzer 112. The linear polarizer 104 is set over the back light module 102. The optically self-compensated birefringence liquid crystal panel 108 is set over the linear polarizer 104. The linear analyzer 112 is set over the optically self-compensated birefringence liquid crystal panel 108. In addition, the compensation film 106 is sandwiched between the linear polarizer 104 and the optically self-compensated birefringence liquid crystal panel 108 and the compensation film 110 is sandwiched between the optically self-compensated birefringence liquid crystal panel 108 and the linear analyzer 112.

The optically self-compensated birefringence liquid crystal panel 108 has a fast responding speed but demands the deployment of some form of optical compensation to attain a wide viewing angle. In the conventional technique, a system that includes the linear polarizer 104 and the linear analyzer 112 together with a pair of compensation films 106 and 110 is set to facilitate wide-angle viewing. In general, one type of wide viewing film with hybrid aligned negative-birefringence structure is utilized to effect viewing compensation. Although such compensation film can secure a good viewing property for the display, the design of the liquid crystal panel is directly constrained by the specification requirement laid down by the compensation film. In another conventional compensation technique, the compensation films 106, 110 fabricated by biaxial materials together with a multi-gap design are deployed to eliminate gray level inversion in wide-angle viewing. However, the multi-gap design increases the complexity in fabricating the liquid crystal panel. Furthermore, the linear polarizer and the linear analyzer combination also render the viewing non-symmetrical due to an intrinsic viewing angle dependency.

SUMMARY OF INVENTION

Accordingly, one object of the present invention is to provide a wide viewing angle quick response liquid crystal display without using the specific wide viewing films to provide a viewing angle compensation for a liquid crystal panel. Hence, the design parameters of the liquid crystal panel will not be subjected to the limitations of the wide viewing film.

A second object of this invention is to provide a wide viewing angle quick response liquid crystal display capable of eliminating gray level inversion due to wide angle viewing without manufacturing a sophisticated multi-gap structure.

A third object of this invention is to provide a wide viewing angle quick response liquid crystal display capable of improving asymmetric viewing angle properties due to an angle dependency of the basic design.

To achieve these and other advantages and in accordance with the purpose of the invention, as embodied and broadly described herein, the invention provides a wide viewing angle quick response liquid crystal display. The liquid crystal display comprises a back light unit, an optical compensation circular polarizer unit, a liquid crystal panel and an optical compensation circular analyzer unit. The optical compensation circular polarizer unit is set over the back light module. The liquid crystal panel is set over the optical compensation circular polarizer unit. The optical compensation circular analyzer unit is set over the liquid crystal panel. This invention utilizes circularly polarized light to provide the wide viewing angle quick response liquid crystal display with an uniform viewing angle property and improved contrast ratio and avoid the large viewing angle gray level inversion problem at the same time.

In one embodiment of this invention, the liquid crystal panel is an optically self-compensated birefringence liquid crystal panel, for example.

In one embodiment of this invention, the optical compensation circular polarizer unit comprises a polarizer plate and a first biaxial compensation film sandwiched between the polarizer plate and the liquid crystal panel. The first biaxial compensation film has principal refractive indices nx, ny and nz corresponding to three principal axes x, y and z axis, respectively. The direction of z-axis is set to be perpendicular to the substrate of the liquid crystal panel. The principal refractive indices nx, ny and nz must satisfy the following inequality relations: nx>ny>nz and 4>(nx−nz)/(nx−ny)>2. Furthermore, the principal axis with an axial refractive index nx forms an included angle $\theta_3$ with the alignment direction of the liquid crystal panel. The angle $\theta_3$ is between 40° to 75°, for example. The optical compensation circular analyzer unit that matches with the optical compensation circular polarizer unit (the polarizer plate and the first biaxial compensation film) comprises an analyzer plate, a uniaxial quarter-wave plate and a second biaxial compensation film. The absorption axis of the analyzer plate is perpendicular to the absorption axis of the polarizer plate. The polarizer plate forms an included angle $\theta_4$ with the alignment direction of the liquid crystal panel. The included angle $\theta_4$ is between 40° to 75°, for example. The second uniaxial quarter-wave plate is sandwiched between the analyzer plate and the liquid crystal panel. The optical axis of the uniaxial quarter-wave plate is set at an angle of 45° relative to the absorption axis of the analyzer plate, for example. The second biaxial compensation film is sandwiched between the second uniaxial quarter-wave plate and the liquid crystal panel. The second biaxial compensation film has principal refractive indices nx', ny' and nz' responding to x, y and z axis, respectively. The principal refractive indices nx', ny' and nz' must satisfy the following inequality relations: nx'>ny'>nz' and (nx'−nz')/(nx'−ny')>6. Furthermore, the principal axis of the second biaxial compensation film with an axial refractive index nx' is perpendicular to the alignment direction of the liquid crystal panel.

In one embodiment of this invention, the optical compensation circular polarizer unit comprises a polarizer plate, a first uniaxial quarter-wave plate and a first biaxial compensation film. The first uniaxial quarter-wave plate is sandwiched between the polarizer plate and the liquid crystal panel, for example. The optical axis of the first uniaxial quarter-wave plate is set at an angle of 45° relative to the absorption axis of the polarizer plate. The first biaxial compensation film is sandwiched between the first uniaxial quarter-wave plate and the liquid crystal panel. The first biaxial compensation film has principal refractive indexes nx, ny and nz. The principal refractive indexes nx, ny and nz must satisfy the following inequality relations: nx>ny>nz and (nx−nz)/(nx−ny)>6. Furthermore, the principal axis with an axial refractive index nx is perpendicular to the alignment direction of the liquid crystal panel. The optical compensation circular analyzer unit that matches with the optical compensation circular polarizer unit (the polarizer plate, the first uniaxial quarter-wave plate and the first biaxial compensation film) comprises an analyzer plate and a second biaxial compensation film sandwiched between analyzer plate and the liquid crystal panel. The absorption axis of the analyzer plate is perpendicular to the absorption axis of the polarizer plate, for example. The absorption axis of the polarizer plate forms an included angle $\theta_1$ with the liquid crystal panel. The included angle $\theta_1$ is between 40° to 75°, for example. The second biaxial compensation film has principal refractive indices nx', ny' and nz'. The principal refractive indices nx', ny' and nz' must satisfy the following inequality relations: nx'>ny'>nz' and 4>(nx'−nz')/(nx'−ny')>2. Furthermore, the principal axis of the second biaxial compensation film with an axial refractive index nx' forms an included angle $\theta_2$ with the alignment direction of the liquid crystal panel. The included angle $\theta_2$ is between 20° to 50°, for example.

In one embodiment of this invention, the optical compensation circular analyzer unit that matches with the optical compensation circular polarizer unit (the polarizer plate, the first uniaxial quarter-wave plate and the first biaxial compensation film) comprises an analyzer plate, a second uniaxial quarter-wave plate and a second biaxial compensation film. The absorption axis of the analyzer plate is perpendicular to the absorption axis of the polarizer plate, for example. The polarizer plate forms an included angle $\theta_0$ with the liquid crystal panel. The included angle $\theta_0$ is between 40° to 50°, for example. The second uniaxial quarter-wave plate is sandwiched between the analyzer plate and the liquid crystal panel. The optical axis of the second uniaxial quarter-wave plate is set at an angle of 45° relative to the absorption axis of the analyzer plate, for example. The second biaxial compensation film is sandwiched between the second uniaxial quarter-wave plate and the liquid crystal panel. The second biaxial compensation film has principal refractive indices nx', ny' and nz'. The principal refractive indices nx', ny' and nz' must satisfy the following inequality relations: nx'>ny'>nz' and (nx'−nz')/(nx'−ny')>6. Furthermore, the principal axis of the second biaxial compensation film with an axial refractive index nx' is perpendicular to the alignment direction of the liquid crystal panel.

In one embodiment of this invention, the optical compensation circular polarizer unit comprises a cholesteric liquid crystal layer and a first biaxial compensation film. The optical compensation circular analyzer unit that matches with the optical compensation circular polarizer unit (the cholesteric liquid crystal layer and the first biaxial compensation film) comprises an analyzer plate, a uniaxial quarter-wave plate and a second biaxial compensation film. The absorption axis of the analyzer plate forms an included angle $\theta_5$ with the alignment direction of the liquid crystal panel. The included angle $\theta_5$ is between 15° to 50°, for example. The uniaxial quarter-wave plate is sandwiched between the analyzer plate and the liquid crystal panel. The optical axis of the second uniaxial quarter-wave plate is set at an angle of 45° relative to the absorption axis of the analyzer plate, for example. The second biaxial compensation film is sandwiched between the uniaxial quarter-wave plate and the liquid crystal panel. The second biaxial compensation film has principal refractive indices nx', ny' and nz'. Furthermore, the principal axis of the second biaxial compensation film with an axial refractive index nx' is perpendicular to the alignment direction of the liquid crystal panel.

In one embodiment of this invention, the optical compensation circular polarizer unit comprises a cholesteric liquid crystal layer and a first biaxial compensation film. The optical compensation circular analyzer unit that matches with the optical compensation circular polarizer unit (the cholesteric liquid crystal layer and the first biaxial compensation film) comprises an analyzer plate and a second biaxial compensation film. The absorption axis of the analyzer plate forms an included angle $\theta_6$ with the alignment direction of the liquid crystal panel. The included angle $\theta_6$ is between 15° to 50°, for example. The second biaxial compensation film is sandwiched between the analyzer plate and the liquid crystal panel. The second biaxial compensation film has principal refractive indices nx', ny' and nz'. Furthermore, the principal axis of the second biaxial compensation film with an axial refractive index nx' forms an included angle $\theta_7$ with the alignment direction of the liquid crystal panel. The included angle $\theta_7$ is between 20° to 50°, for example.

In brief, the wide viewing angle quick response liquid crystal display in this invention is operated by circularly polarized light so that the uniformity of viewing angle properties and contrast ratio are improved and gray level inversion at wide viewing angle is prevented.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
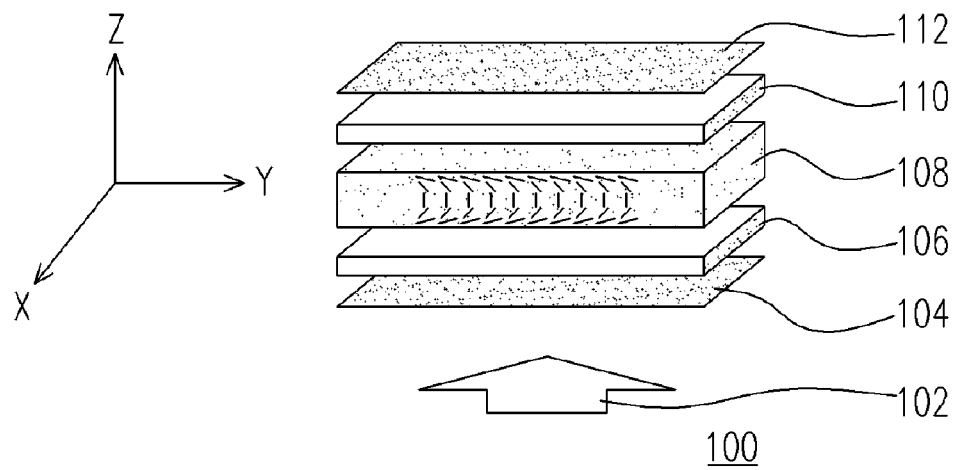
FIG. 1 is a perspective view showing the structural layout of a conventional wide viewing angle quick response liquid crystal display.

Reference will now be made in detail to the present preferred embodiments of the invention, examples of which are illustrated in the accompanying drawings. Wherever possible, the same reference numbers are used in the drawings and the description to refer to the same or like parts.

Figure 2:
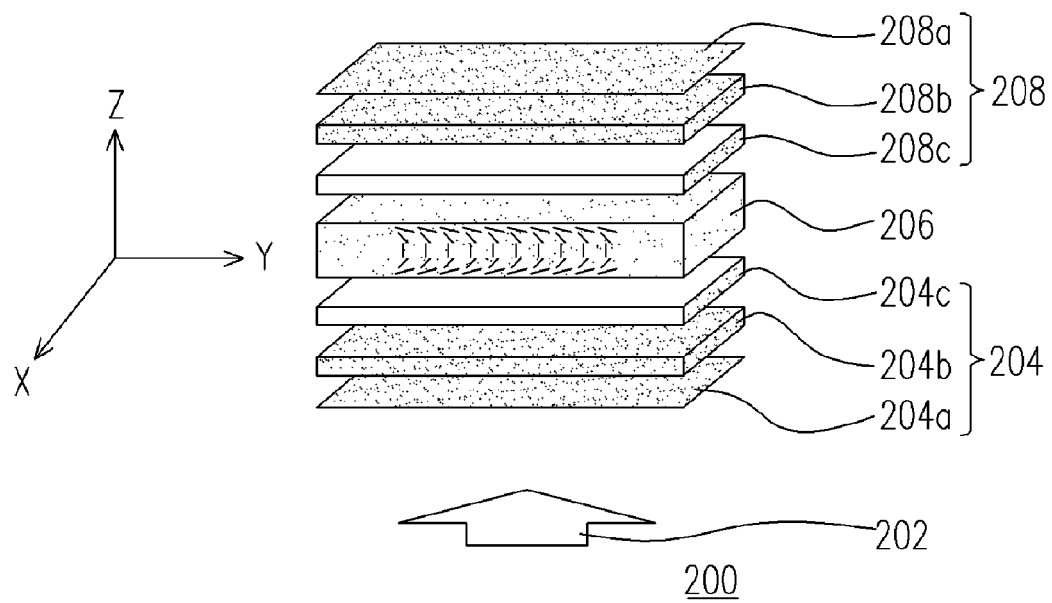
FIG. 2 is a perspective view showing the structural layout of a wide viewing angle liquid crystal display according to a first preferred embodiment of this invention.
Figure 3:
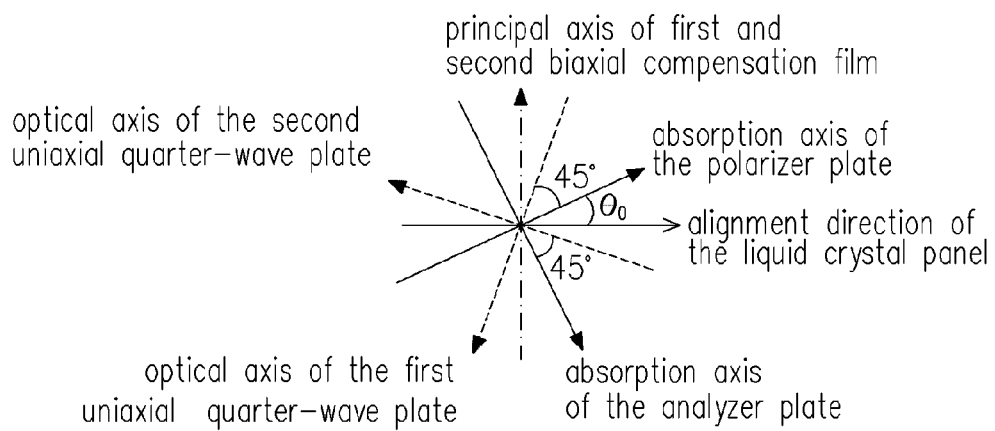
FIG. 3 is a schematic diagram showing the relatively axial orientation angle of various optical films in FIG. 2.

FIG. 2 is a perspective view showing the structural layout of a wide viewing angle liquid crystal display according to a first preferred embodiment of this invention. FIG. 3 is a schematic diagram showing the relatively axial orientation angle of various optical films in FIG. 2. As shown in FIG. 2, the wide viewing angle quick response liquid crystal display 200 comprises a back light unit 202, an optical compensation circular polarizer unit 204, a liquid crystal panel 206 and an optical compensation circular analyzer unit 208. The optical compensation circular polarizer unit 204 is set over the back light unit 202. The liquid crystal panel 206 is a quick response optically self-compensated birefringence liquid crystal panel (OCB-LCD), for example. The liquid crystal panel 206 is set over the optical compensation circular polarizer unit 204. The optical compensation circular analyzer unit 208 is set over the liquid crystal panel 206.

As shown in FIGS. 2 and 3, the optical compensation circular polarizer unit 204 comprises a polarizer plate 204a, a first uniaxial quarter-wave plate 204b and a first biaxial compensation film 204c. The first uniaxial quarter-wave plate 204b is sandwiched between the polarizer plate 204a and the liquid crystal panel 206. The optical axis of the first uniaxial quarter-wave plate 204b is set at an angle of 45° relative to the absorption axis of the polarizer plate 204a, for example. The first biaxial compensation film 204c is sandwiched between the first uniaxial quarter-wave plate 204b and the liquid crystal panel 206. The first biaxial compensation film 204c has principal refractive indices nx, ny and nz. The principal refractive indices nx, ny and nz must satisfy the following inequality relations: nx>ny>nz and (nx−nz)/(nx−ny)>6. Furthermore, the principal axis of the first biaxial compensation film 204c with an axial refractive index nx is perpendicular to the alignment direction of the liquid crystal panel 206.

In this embodiment, the optical compensation circular analyzer unit 208 that matches with the optical compensation circular polarizer unit 204 (the polarizer plate 204a, the first uniaxial quarter-wave plate 204b and the first biaxial compensation film 204c) comprises an analyzer plate 208a, a second uniaxial quarter-wave plate 208b and a second biaxial compensation film 208c. The absorption axis of the analyzer plate 208a is perpendicular to the absorption axis of the polarizer plate 204a. The polarizer plate 204a forms an included angle $\theta_0$ with the alignment direction of the liquid crystal panel 206. The included angle $\theta_0$ is between 40° to 50°, for example.

The second uniaxial quarter-wave plate 208b is sandwiched between the analyzer plate 208a and the liquid crystal panel 206. The optical axis of the second uniaxial quarter-wave plate 208b is set at an angle of 45° relative to the absorption axis of the analyzer plate 208a, for example. The second biaxial compensation film 208c is sandwiched between the second uniaxial quarter-wave plate 208b and the liquid crystal panel 206. The second biaxial compensation film 208c has principal refractive indices nx', ny' and nz'. The principal refractive indices nx', ny' and nz' must satisfy the following inequality relations: nx'>ny'>nz' and (nx'−nz')/(nx'−ny')>6. Furthermore, the principal axis of the second biaxial compensation film 208c with an axial refractive index nx' is perpendicular to the alignment direction of the liquid crystal panel 206.

Figure 4:
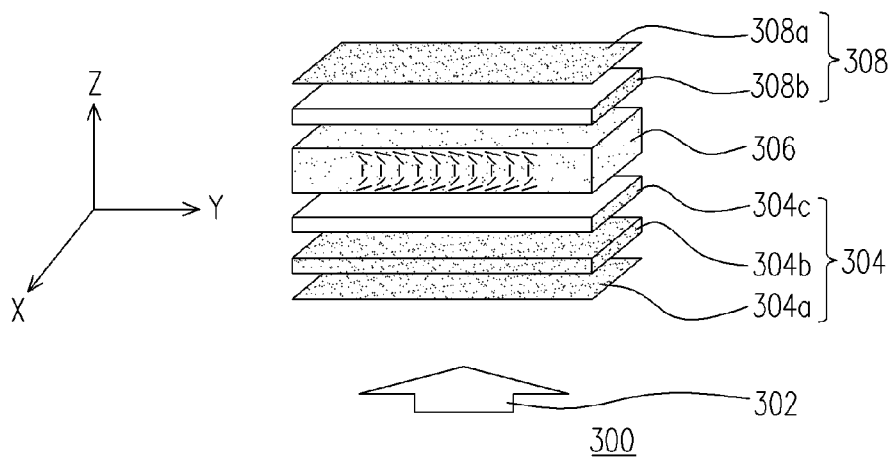
FIG. 4 is a perspective view showing the structural layout of a wide viewing angle liquid crystal display according to a second preferred embodiment of this invention.
Figure 5:
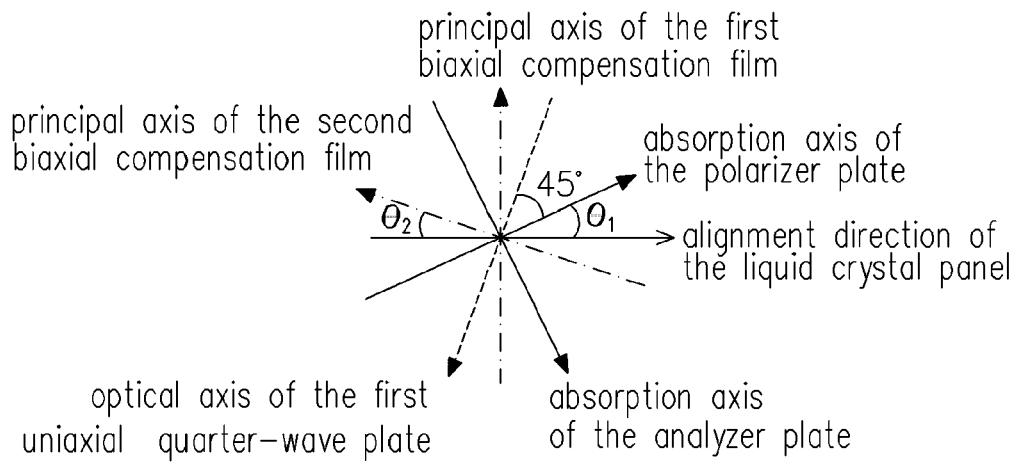
FIG. 5 is a schematic diagram showing the relatively axial orientation angle of various optical films in FIG. 4.

FIG. 4 is a perspective view showing the structural layout of a wide viewing angle liquid crystal display according to a second preferred embodiment of this invention. FIG. 5 is a schematic diagram showing the relatively axial orientation angle of various optical films in FIG. 4. As shown in FIG. 4, the wide viewing angle quick response liquid crystal display 300 comprises a back light unit 302, an optical compensation circular polarizer unit 304, a liquid crystal panel 306 and an optical compensation circular analyzer unit 308. Since the components of the liquid crystal display 300 are positioned in an identical way as in the first embodiment, and therefore a detailed description of the locations of these components are omitted.

As shown in FIGS. 4 and 5, the optical compensation circular polarizer unit 304 comprises a polarizer plate 304a, a first uniaxial quarter-wave plate 304b and a first biaxial compensation film 304c. The first uniaxial quarter-wave plate 304b is sandwiched between the polarizer plate 304a and the liquid crystal panel 306. The optical axis of the first uniaxial quarter-wave plate 304b is set at an angle of 45° relative to the absorption axis of the polarizer plate 304a, for example. The first biaxial compensation film 304c is sandwiched between the first uniaxial quarter-wave plate 304b and the liquid crystal panel 306. The first biaxial compensation film 304c has principal refractive indices nx, ny and nz. The principal refractive indices nx, ny and nz must satisfy the following inequality relations: nx>ny>nz and (nx−nz)/(nx−ny)>6. Furthermore, the principal axis of the first biaxial compensation film 304c with an axial refractive index nx is perpendicular to the alignment direction of the liquid crystal panel 306.

In this embodiment, the optical compensation circular analyzer unit 308 that matches with the optical compensation circular polarizer unit 304 (the polarizer plate 304a, the first uniaxial quarter-wave plate 304b and the first biaxial compensation film 304c) comprises an analyzer plate 308a and a second biaxial compensation film 308b sandwiched between the analyzer plate 308a and the liquid crystal panel 308. The absorption axis of the analyzer plate 308a is perpendicular to the absorption axis of the polarizer plate 304a. The polarizer plate 304a forms an internal angle $\theta_1$ with the alignment direction of the liquid crystal panel 306. The internal angle $\theta_1$ is between 40° to 75°, for example. The second biaxial compensation film 308b has principal refractive indexes nx', ny' and nz'. The principal refractive indexes nx', ny' and nz' must satisfy the following inequality relations: nx'>ny'>nz' and 4>(nx'−nz')/(nx'−ny')>2. Furthermore, the principal axis of the second biaxial compensation film 208c with an axial refractive index nx' forms an included angle $\theta_2$ with the alignment direction of the liquid crystal panel 306. The included angle $\theta_2$ is between 20° to 50°, for example.

Figure 6:
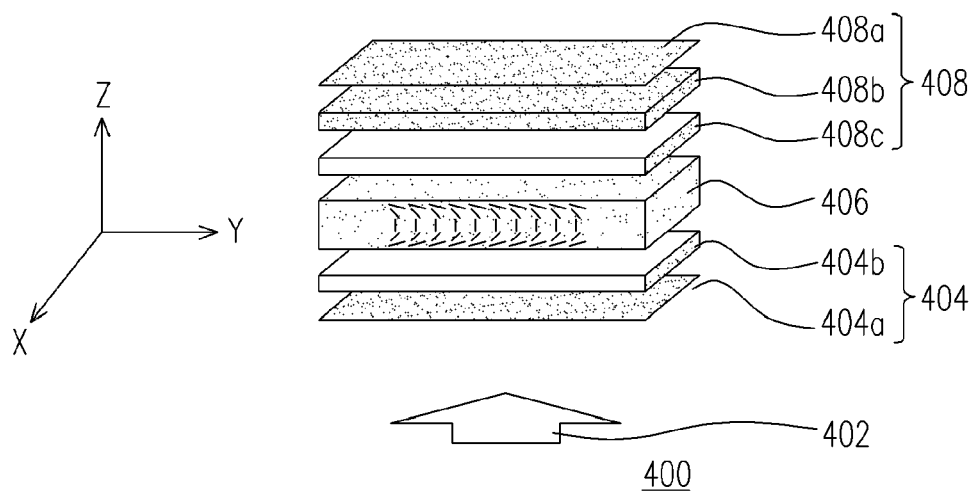
FIG. 6 is a perspective view showing the structural layout of a wide viewing angle liquid crystal display according to a third preferred embodiment of this invention.
Figure 7:
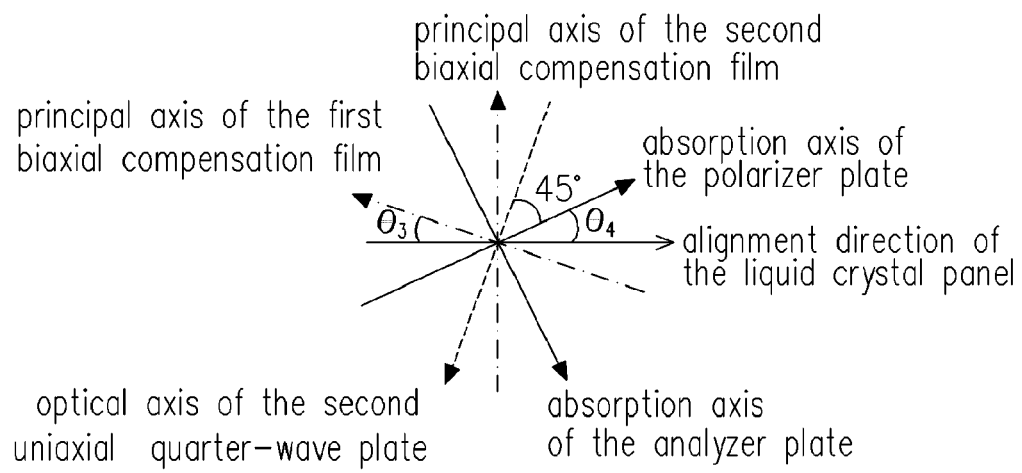
FIG. 7 is a schematic diagram showing the relatively axial orientation angle of various optical films in FIG. 6.

FIG. 6 is a perspective view showing the structural layout of a wide viewing angle liquid crystal display according to a third preferred embodiment of this invention. FIG. 7 is a schematic diagram showing the relatively axial orientation angle of various optical films in FIG. 6. As shown in FIG. 6, the wide viewing angle quick response liquid crystal display 400 comprises a back light unit 402, an optical compensation circular polarizer unit 404, a liquid crystal panel 406 and an optical compensation circular analyzer unit 408. Since the components of the liquid crystal display 400 are positioned in an identical way as the first embodiment, and therefore a detailed description of the locations of these components are omitted.

As shown in FIGS. 6 and 7, the optical compensation circular polarizer unit 404 comprises a polarizer plate 404a and a first biaxial compensation film 404b sandwiched between the polarizer plate 404a and the liquid crystal panel 406. The first biaxial compensation film 404a has principal refractive indices nx, ny and nz. The principal refractive indices nx, ny and nz must satisfy the following inequality relations: nx>ny>nz and 4>(nx−nz)/(nx−ny)>2. Furthermore, the principal axis of the first biaxial compensation film 404b with an axial refractive index nx forms an included angle $\theta_3$ with the alignment direction of the liquid crystal panel 406. The included angle $\theta_3$ is between 40° to 75°, for example.

In this embodiment, the optical compensation circular analyzer unit 408 that matches with the optical compensation circular polarizer unit 404 (the polarizer plate 404a and the first biaxial compensation film 404b) comprises an analyzer plate 408a, a uniaxial quarter-wave plate 408b and a second biaxial compensation film 408c. The absorption axis of the analyzer plate 408a is perpendicular to the absorption axis of the polarizer plate 404a. The polarizer plate 404a forms an included angle $\theta_4$ with the alignment direction of the liquid crystal panel 406. The included angle $\theta_4$ is between 40° to 75°, for example. The second biaxial compensation film 408c is sandwiched between the uniaxial quarter-wave plate 408b and the liquid crystal panel 406. The second biaxial compensation film 408c has principal refractive indices nx', ny' and nz'. The principal refractive indices nx', ny' and nz' must satisfy the following inequality relations: nx'>ny'>nz' and (nx'−nz')/(nx'−ny')>6. Furthermore, the principal axis of the second biaxial compensation film 408c with the refractive index nx' is perpendicular to the alignment direction of the liquid crystal panel 406.

Figure 8:
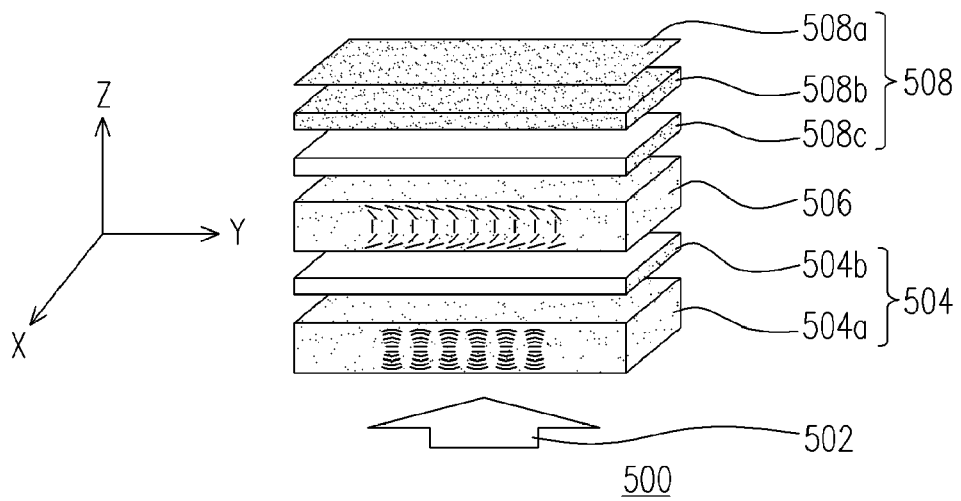
FIG. 8 is a perspective view showing the structural layout of a wide viewing angle liquid crystal display according to a fourth preferred embodiment of this invention.
Figure 9:
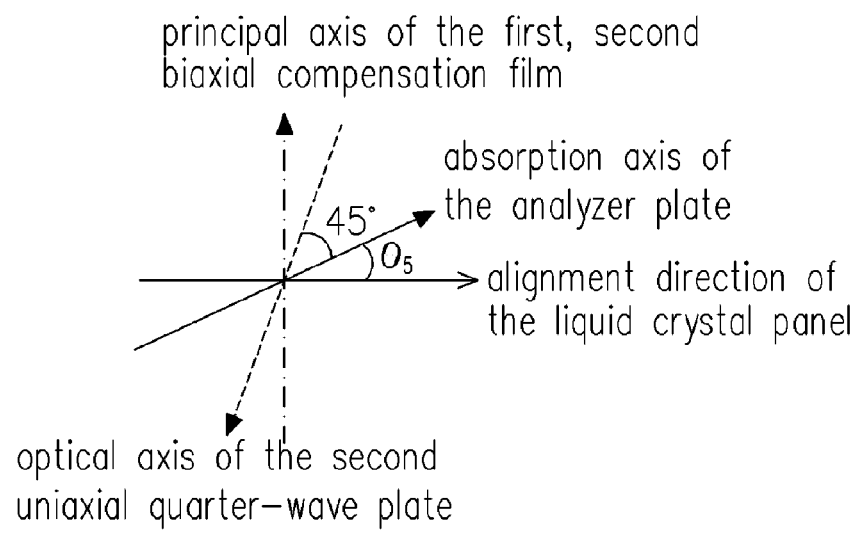
FIG. 9 is a schematic diagram showing the relatively axial orientation angle of various optical films in FIG. 8.

FIG. 8 is a perspective view showing the structural layout of a wide viewing angle liquid crystal display according to a fourth preferred embodiment of this invention. FIG. 9 is a schematic diagram showing the relatively axial orientation angle of various optical films in FIG. 8. As shown in FIG. 8, the wide viewing angle quick response liquid crystal display 500 comprises a back light unit 502, an optical compensation circular polarizer unit 504, a liquid crystal panel 506 and an optical compensation circular analyzer unit 508. Since the components of the liquid crystal display 500 are positioned in an identical way as the first embodiment, and therefore a detailed description of the locations of these components are omitted.

As shown in FIGS. 8 and 9, the optical compensation circular polarizer unit 504 comprises a cholesteric liquid crystal layer 504a and a first biaxial compensation film 504b sandwiched between the cholesterol liquid crystal layer 504a and the liquid crystal panel 506. The first biaxial compensation film 504b has principal refractive indices nx, ny and nz. The principal refractive indices nx, ny and nz must satisfy the following inequality relations: nx>ny>nz. Furthermore, the principal axis of the first biaxial compensation film 504b with an axial refractive index nx is perpendicular to the alignment direction of the liquid crystal panel 506.

In this embodiment, the optical compensation circular analyzer unit 508 that matches with the optical compensation circular polarizer unit 504 (the cholesteric liquid crystal layer 504a and the first biaxial compensation film 504b) comprises an analyzer plate 508a, a uniaxial quarter-wave plate 508b and a second biaxial compensation film 508c. The absorption axis of the analyzer plate 508a forms an included angle $\theta_5$ with the alignment direction of the liquid crystal panel 506. The included angle $\theta_5$ is between 15° to 50°. The second uniaxial quarter-wave plate 508b is sandwiched between the analyzer plate 508a and the liquid crystal panel 506. The optical axis of the uniaxial quarter-wave plate 508b is set at an included angle of 45° relative to the absorption axis of the analyzer plate 508a. The second biaxial compensation film 508c is sandwiched between the second uniaxial quarter-wave plate 508b and the liquid crystal panel 506. The second biaxial compensation film 508c has principal refractive indices nx', ny' and nz'. Furthermore, the principal axis of the second biaxial compensation film 508c with the refractive index nx' is perpendicular to the alignment direction of the liquid crystal panel 506.

Figure 10:
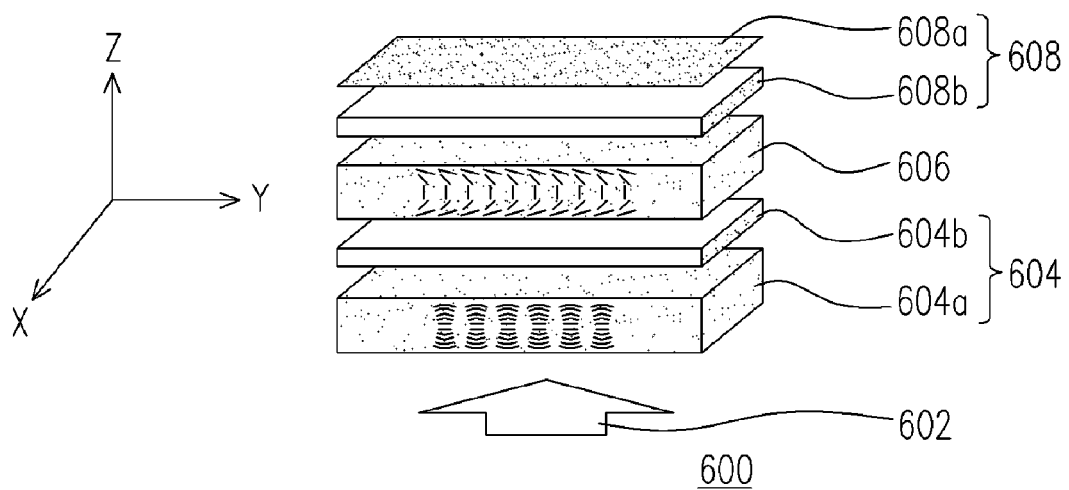
FIG. 10 is a perspective view showing the structural layout of a wide viewing angle liquid crystal display according to a fifth preferred embodiment of this invention.
Figure 11:
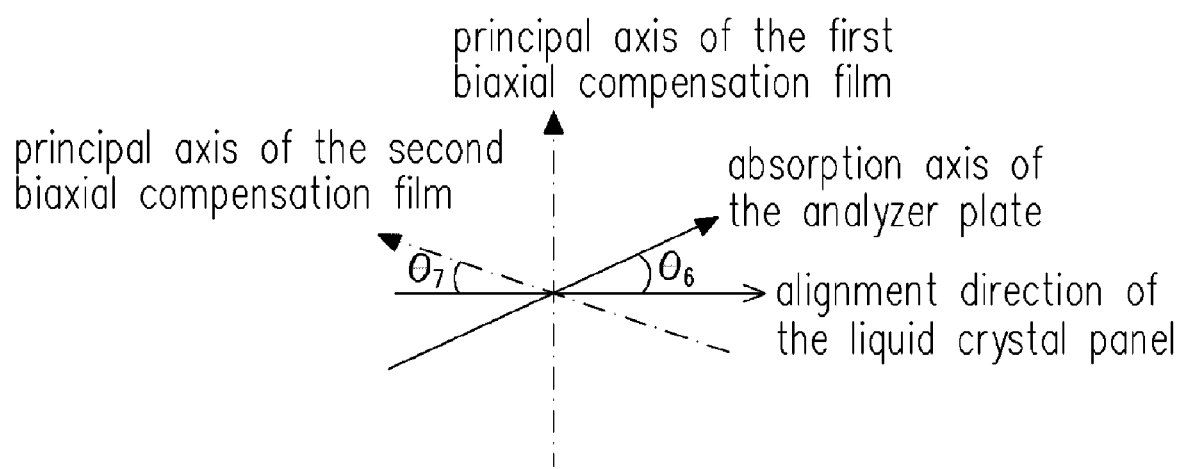
FIG. 11 is a schematic diagram showing the relatively axial orientation angle of various optical films in FIG. 10.

FIG. 10 is a perspective view showing the structural layout of a wide viewing angle liquid crystal display according to a fifth preferred embodiment of this invention. FIG. 11 is a schematic diagram showing the relatively axial orientation angle of various optical films in FIG. 10. As shown in FIG. 10, the wide viewing angle quick response liquid crystal display 600 comprises a back light unit 602, an optical compensation circular polarizer unit 604, a liquid crystal panel 606 and an optical compensation circular analyzer unit 608. Since the components of the liquid crystal display 600 are positioned in an identical way as the first embodiment, and therefore a detailed description of the locations of these components are omitted.

As shown in FIGS. 10 and 11, the optical compensation circular polarizer unit 604 comprises a cholesteric liquid crystal layer 604a and a first biaxial compensation film 604b. The first biaxial compensation film 604b is sandwiched between the cholesterol liquid crystal layer 604a and the liquid crystal panel 606. The first biaxial compensation film 604b has principal refractive indices nx, ny and nz. The principal refractive indexes nx, ny and nz must satisfy the following inequality relations: nx>ny>nz. Furthermore, the principal axis of the first biaxial compensation film 604b with an axial refractive index nx is perpendicular to the alignment direction of the liquid crystal panel 606.

In this embodiment, the optical compensation circular analyzer unit 608 that matches with the optical compensation circular polarizer unit 604 (the cholesteric liquid crystal layer 604a and the first biaxial compensation film 604b) comprises an analyzer plate 608a and a second biaxial compensation film 608b. The absorption axis of the analyzer plate 608a forms an included angle $\theta_6$ with the alignment direction of the liquid crystal panel 606. The included angle $\theta_6$ is between 15° to 50°, for example. The second biaxial compensation film 608b is sandwiched between the analyzer plate 608a and the liquid crystal panel 606. The second biaxial compensation film 608b has principal refractive indices nx', ny' and nz'. Furthermore, the principal axis of the second biaxial compensation film 508c with the refractive index nx' forms an included angle $\theta_7$ with the alignment direction of the liquid crystal panel 606. The included angle $\theta_7$ is between 20° to 50°, for example.

In summary, major advantages of the wide viewing angle, quick response liquid crystal display of this invention includes: 1. Circularly polarized light is used in the display operation so that viewing angle dependency is effectively reduced. 2. Uniaxial quarter-wave plate together with biaxial compensation film is deployed for optical compensation. Therefore, the uniformity of viewing angle properties and contrast ratio are improved and gray level inversion at wide viewing angle is prevented. 3. Cholesteric liquid crystal layer together with biaxial compensation film is used for optical compensation so that the uniformity of viewing angle properties and contrast ratio are improved and gray level inversion at wide viewing angle is prevented.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A wide viewing angle liquid crystal display, comprising:
    a back light unit;
    an optical compensation circular polarizer unit disposed over the back light unit;
    an optically self-compensated birefringence liquid crystal panel disposed over the optical compensation circular polarizer unit; and
    an optical compensation circular analyzer unit disposed over the optically self-compensated birefringence liquid crystal panel, and the optical compensation circular analyzer unit comprising;
        an analyzer plate, wherein the absorption axis of the analyzer plate is perpendicular to the absorption axis of the polarizer plate, and the polarizer plate form an included angle of between 40° to 50° with the alignment direction of the liquid crystal panel;
        a second uniaxial quarter-wave plate sandwiched between the analyzer plate and the optically self-compensated birefringence liquid crystal panel, wherein the optical axis of the second uniaxial quarter-wave plate forms an included angle of about 45° with the absorption axis of the analyzer plate; and
        a second biaxial compensation film sandwiched between the second uniaxial quarter-wave plate and the optically self-compensated birefringence liquid crystal panel, wherein the second biaxial compensation film hasprincipal refractive indices nx', ny' and nz' that satisfy the following inequality relations: nx'>ny'>nz' and 4>(nx'−nz')/(nx'−ny')>2, and the principal axis with the refractive index nx' is perpendicular to the alignment direction of the liquid crystal panel.

2. The liquid crystal display of claim 1, wherein the optical compensation circular polarizer unit further comprises:
    a polarizer plate; and
    a first biaxial compensation film sandwiched between the polarizer plate and the liquid crystal panel.

3. The liquid crystal display of claim 2, wherein the first biaxial compensation film has principal refractive indices nx, ny and nz that satisfies the following inequality relations: nx>ny>nz and 4>(nx−nz)/(nx−ny)>2, and the principal axis with the refractive index nx forms an included angle between 40° to 75° with the alignment direction of the liquid crystal panel.

4. The liquid crystal display of claim 1, wherein the optical compensation circular polarizer unit further comprises:
    a polarizer plate;
    a first uniaxial quarter-wave plate-sandwiched between the polarizer plate and the liquid crystal panel, wherein the optical axis of the first uniaxial quarter-wave plate and an absorption axis of the polarizer plate form an included angle of about 45°; and
    a first biaxial compensation film sandwiched between the first uniaxial quarter-wave plate and the liquid crystal panel.

5. The liquid crystai display of claim 4, wherein the first biaxial compensation film has principal refractive indices nx, ny and nz that satisfy the following inequality relations: nx>ny>nz and (nx−nz)/(nx−ny)>6, and the principal axis with the refractive index nx is perpendicular to the alignment direction of the liquid crystal panel.

* * * * *